(12) United States Patent
Das et al.

(10) Patent No.: US 12,166,690 B2
(45) Date of Patent: Dec. 10, 2024

(54) BACKEND SERVICES AND RESOURCES CONTROLLER

(71) Applicant: Dell Products L.P., Round Rock, TX (US)

(72) Inventors: Suprava Das, Bangalore (IN); Bathulwar Akash, Bangalore (IN); Aditya Mattaparthi, Bangalore Rural (IN); Piyush Tibrewal, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/844,827

(22) Filed: Jun. 21, 2022

(65) Prior Publication Data

US 2023/0412521 A1    Dec. 21, 2023

(51) Int. Cl.
*H04L 47/762* (2022.01)
*H04L 47/74* (2022.01)
*H04L 47/783* (2022.01)

(52) U.S. Cl.
CPC .......... *H04L 47/762* (2013.01); *H04L 47/748* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 9,626,257 B1* | 4/2017 | Tang | G06F 3/06 |
| 11,550,787 B1* | 1/2023 | Hernich | G06F 16/24539 |
| 2013/0339604 A1* | 12/2013 | Zuluaga | G06F 3/0605 |
| | | | 711/E12.017 |
| 2019/0196420 A1* | 6/2019 | Littlefield | G16H 20/60 |
| 2021/0081197 A1* | 3/2021 | Chen | G06F 9/455 |
| 2022/0129173 A1* | 4/2022 | Martin | G06F 3/061 |
| 2022/0182359 A1* | 6/2022 | Devaraj | H04L 63/0876 |
| 2023/0077836 A1* | 3/2023 | Vohra | G06F 21/6218 |

* cited by examiner

*Primary Examiner* — Mohamed Ibrahim
(74) *Attorney, Agent, or Firm* — Krishnendu Gupta; Nikhil Patel (57) ABSTRACT

Aspects of the present disclosure relate to managing storage array resources. In embodiments, a request from a client machine is received by a storage array via a command-line path. Additionally, the consumption of storage array resources can be controlled. For instance, resource consumption control can include limiting an initialization of one or more microservices based on the request's related information.

20 Claims, 5 Drawing Sheets

BACKEND SERVICES AND RESOURCES CONTROLLER

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data and delivers one or more distributed storage services for an organization. For example, a financial institution can use storage arrays to collect and store financial transactions from its local banks (e.g., bank account deposits/withdrawals). Additionally, the financial institution can also use the storage array to collect information related to loan transactions (e.g., mortgages). Accordingly, the storage array can provide the financial institution with many services unique to each transaction type.

SUMMARY

In one aspect, a method includes receiving a request from a client machine at a storage array via a command-line path and controlling storage array resources consumption. Further, controlling the resource consumption includes limiting an initialization of one or more microservices based on the request's related information.

In embodiments, the method can also include initializing one or more request-related microservices in response to receiving the request.

In embodiments, the method can also include initializing one or more array-related microservices before receiving the request. Additionally, one or more array-related microservices can be unrelated to the request's related information.

In embodiments, the method can also include identifying a user profile corresponding to the client machine and determining a user role related to the user profile.

In embodiments, the method can also include determining an application programming interface (API) endpoint to which the client machine issued the request. Other technical features can be readily apparent to one skilled in the art from the following figures, descriptions, and claims.

In embodiments, the method can also include monitoring each request-related microservice initialized in response to receiving the request. Additionally, the method can include correlating each initialized microservice with one or more request characteristics.

In embodiments, the method can also include correlating each initialized microservice with the request's metadata defining the request's characteristics.

In embodiments, the method can also include analyzing historical, current, and anticipated initializations of microservices and generating one or more request-to-microservices initialization models based on the analysis.

In embodiments, the method can also include correlating each request-to-microservices initialization model with input/output (IO) workload models and generating one or more microservices models based on the correlation.

In embodiments, the method can also include limiting the initialization of the microservices based on the microservices models.

In one aspect, a computing apparatus includes a processor. The computing apparatus can also include a memory that stores instructions. Further, when the processor executes the instructions, the apparatus can receive a request from a client machine at a storage array via a command-line path. Additionally, the apparatus controls storage array resource consumption. Moreover, controlling the resource consumption includes limiting an initialization of one or more microservices based on the request's related information.

In embodiments, the apparatus can also initialize one or more request-related microservices in response to receiving the request.

In embodiments, the apparatus can also include where the instructions further configure the apparatus to initialize one or more array-related microservices before receiving the request. Further, one or more array-related microservices can be unrelated to the request's related information.

In embodiments, the apparatus can also identify a user profile corresponding to the client machine and determine a user role related to the user profile.

In embodiments, the apparatus can also determine an application programming interface (API) endpoint to which the client machine issued the request.

In embodiments, the apparatus can monitor each request-related microservice initialized in response to receiving the request. Additionally, the apparatus can correlate each initialized microservice with one or more request characteristics.

In embodiments, the apparatus can also correlate each initialized microservice with the request's metadata defining the request's characteristics.

In embodiments, the apparatus can also analyze historical, current, and anticipated initializations of microservices. Further, the apparatus can generate one or more request-to-microservices initialization models based on the analysis.

In embodiments, the apparatus can also correlate each request-to-microservices initialization model with one or more input/output (IO) workload models. Additionally, the apparatus can generate one or more microservices models based on the correlation.

In embodiments, the apparatus can limit the initialization of one or more microservices based on one or more microservices models.

Other technical features can be readily apparent to one skilled in the art from the following figures, descriptions, and claims.

DETAILED DESCRIPTION

Today, many organizations deliver customers several business functions (e.g., customer-facing services). For example, a financial institution allows its customers to deposit, withdraw, and borrow. Similarly, social platforms allow their customers to post updates, search posts and friends, and upload images. Accordingly, these organizations can include an information technology (IT) infrastructure with one or more storage arrays that deliver these services Rather than grouping the services into a large monolith service component, organizations can segment each service into independent service components (e.g., microservices). Further, each of these services can include additional backend services (e.g., invisible to the user or customer) that enable these customer-facing services. For example, a bank's service that allows its customers to deposit funds into their accounts can require information that associates customers with their respecting account numbers.

Accordingly, these customer-facing services can use one or more distributed storage services delivered by, e.g., a storage array. For example, a bank's depositing service can send a request to a storage array to authenticate a customer and obtain the customer's related banking information. Additionally, a bank's IT administrator can access the depositing service to perform one or more related IT-related tasks.

In each circumstance, the backend initiates several operations to deliver the depositing service. However, the IT-related tasks may not require the same backend operations as the bank's customer. Consequently, the bank's backend infrastructure can unnecessarily consume resources. Accordingly, embodiments of the present disclosure relate to managing backend services based on, e.g., one or more service request characteristics.

Figure 1:
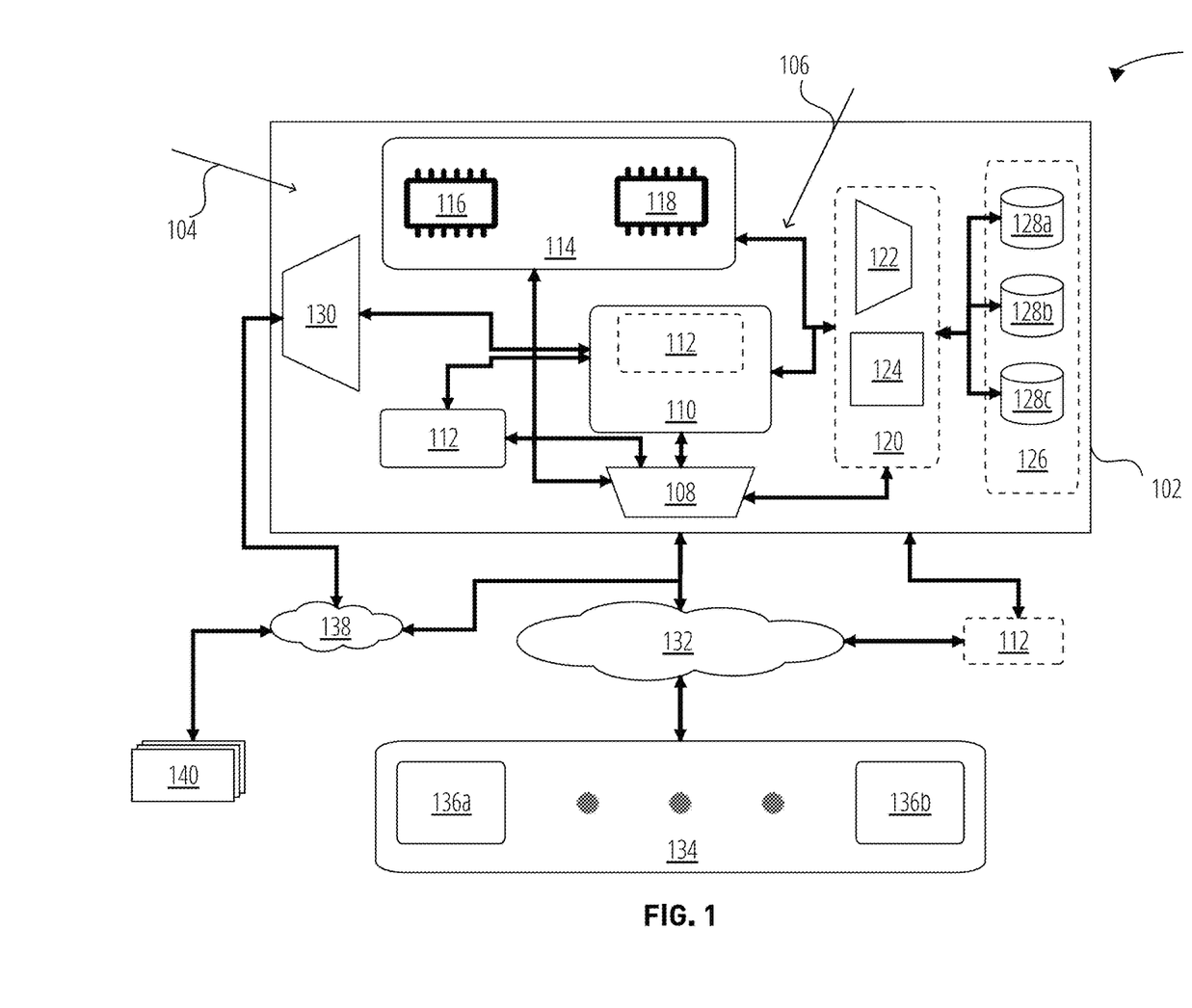
FIG. 1 illustrates a distributed network environment that includes a storage array in accordance with embodiments of the present disclosure.

Regarding FIG. 1, a distributed network environment 100 can include a storage array 102, a remote system 140, and hosts 134. In embodiments, the storage array 102 can include components 104 that perform one or more distributed file storage services. Additionally, the storage array 102 can include one or more internal communication channels 106 106 that communicatively couple the components 104. For example, the communication channels 106 can include Fibre channels, busses, communication modules, and the like.

In embodiments, the storage array 102, components 104, remote system 140, and hosts 134 can include a variety of proprietary or commercially available single or multi-processor systems (e.g., parallel processor systems). The single or multi-processor systems can include central processing units (CPUs), graphical processing units (CPUs), and the like. Additionally, the storage array 102, remote system 140, and hosts 134 can virtualize one or more of their respective physical computing resources (e.g., processors (not shown), memory 114, and storage devices 126).

In embodiments, the storage array 102 and two or more devices can form a network 132. For example, the network 132 can link the devices via a communication medium like cables, telephone lines, radio waves, satellites, or infrared light beams. Thus, the linked device, collectively, can form the network 132. Further, the network 132 can form a storage area network (SAN), local area network (LAN), wide area network (WAN) (e.g., the Internet), Explicit Congestion Notification (ECN), an Enabled Ethernet network, and the like. Additionally, the storage array 102 and a remote system 140 can establish a remote network (RN 138). Furthermore, network 132 and the RN 138 can include communication nodes that enable network communications. For example, the communication nodes can include switching equipment, phone lines, repeaters, multiplexers, satellites, etc. Moreover, one or more network bridges or link(s) can enable cross-network communications between network 132 and the RN 138.

The network 132 or the RN 138 can have a SAN architecture that allows the storage array 102 and other networked devices (e.g., the hosts 134 and remote system 140) to send/receive electronic communications using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like. Further, the storage array 102 and other networked devices can connect to the network 132 or the RN 138 via a network interface. The network interface can include a wired/wireless network connection interface, bus, data link, and the like. For example, the storage array 102 can include a host adapter (HA) 108 that connects the storage array 102 to the network 132 (e.g., SAN). Additionally, the storage array 102 can include a remote adapter (RA) 130 that connects the storage array 102 to the RN 138.

In embodiments, the storage array 102 and its components 104 can process input/output (IO) workloads received from the network 132 or the RN 138 from networked devices (e.g., the hosts 134). An IO workload can include one or more IO requests or operations (e.g., read/write requests or other storage service-related requests) from the hosts 134 or the remote system 140. For example, hosts 134 can include client machines 136a-136b with one or more applications. The applications can require one or more of the storage array's storage services. Accordingly, each application can send one or more IO requests to the storage array 102. Additionally, each IO request can include instructions for reading data from or writing data to the array's memory 114 or storage drives 128a-128c.

In embodiments, the storage array 102 can include a memory 114 that stores instructions a processor can execute to perform one or more storage-related operations. Additionally, the memory 114 can include volatile or nonvolatile memory. Further, the memory 114 can include random access memory (RAM), dynamic RAM (DRAM), static RAM (SRAM), and other similar memory types. Moreover, each memory type can have distinct performance characteristics (e.g., speed corresponding to reading/writing data).

In embodiments, the memory 114 can include global memory (GM 116) and local memory (LM 118) that cache data to enable the execution of one or more storage-related services as described herein. The memory 114, GM 116, and LM 118 can include register memory, shared memory, constant memory, user-defined memory, and the like. Further, the GM 116 can include cache memory, and the LM 118 can include the array's primary memory.

In embodiments, the storage array 102 can include storage devices 126 that provide distributed storage solutions for, e.g., the hosts 134. The storage devices 126 can include storage drives 128a-128c. The storage drives 128a-128c can include a hard disk drive (HDD), solid-state drive (SSD), and the like. Accordingly, each storage drive 128a-128c can have distinct performance characteristics (e.g., read/write speeds).

The storage array 102 can also include a host adapter (HA 108), e.g., a Fibre Channel Adapter (FA) and the like, that manages the IO requests from hosts 134. For example, the storage array 102 can cache the IO request's target data in memory 114 (e.g., GM 116). Accordingly, the HA 108 can direct the IO requests to the array's Enginuity Data Services processor (EDS 110) that manages access requests to the array's memory 114. In other examples, the storage array 102 can store the IO request's target data in one or more storage devices 126 (e.g., storage drives 128a-128c). Accordingly, the HA 108 can direct the IO requests to the array's device interface 120. For example, the device interface 120 can include a disk adapter (DA 122) and a flash interface 124 that manage access requests to one or more of the array's storage devices 126.

In embodiments, a service level agreement (SLA) can define at least one Service Level Objective (SLO) the hosts 134 require from the storage array 102. For example, each application executed by the hosts 134 can generate or require data with distinct importance levels. Therefore, the SLO can group the data into corresponding distinct data category levels. Further, the SLO can specify a service level (SL) for each data category level, defining each SL's distinct performance requirement (e.g., a response time and uptime).

In embodiments, the EDS 110 can perform one or more self-optimizing techniques (e.g., one or more machine learning techniques) that deliver performance, resource availability, data integrity services, and the like. Further, the EDS 110 can establish a storage and memory hierarchy based on the SLA and the performance capabilities of the array's memory and storage drives 128a-128c.

In embodiments, the storage array 102 can include a controller 112 with, e.g., logic or circuitry elements that perform one or more storage-related services. For example, the controller 112 and its elements can have an architecture designed to manage backend storage services as described in greater detail herein.

In addition to residing within the storage array 102, the controller 112 and its elements can reside external to the storage array 102 or within the one or more components 104 (e.g., EDS 110). When external from the storage array 102, the controller 112 can communicate with the storage array 102 using any known communication connections. For example, the communications connections can include a serial port, parallel port, network interface card (e.g., Ethernet), etc.

Figure 2:
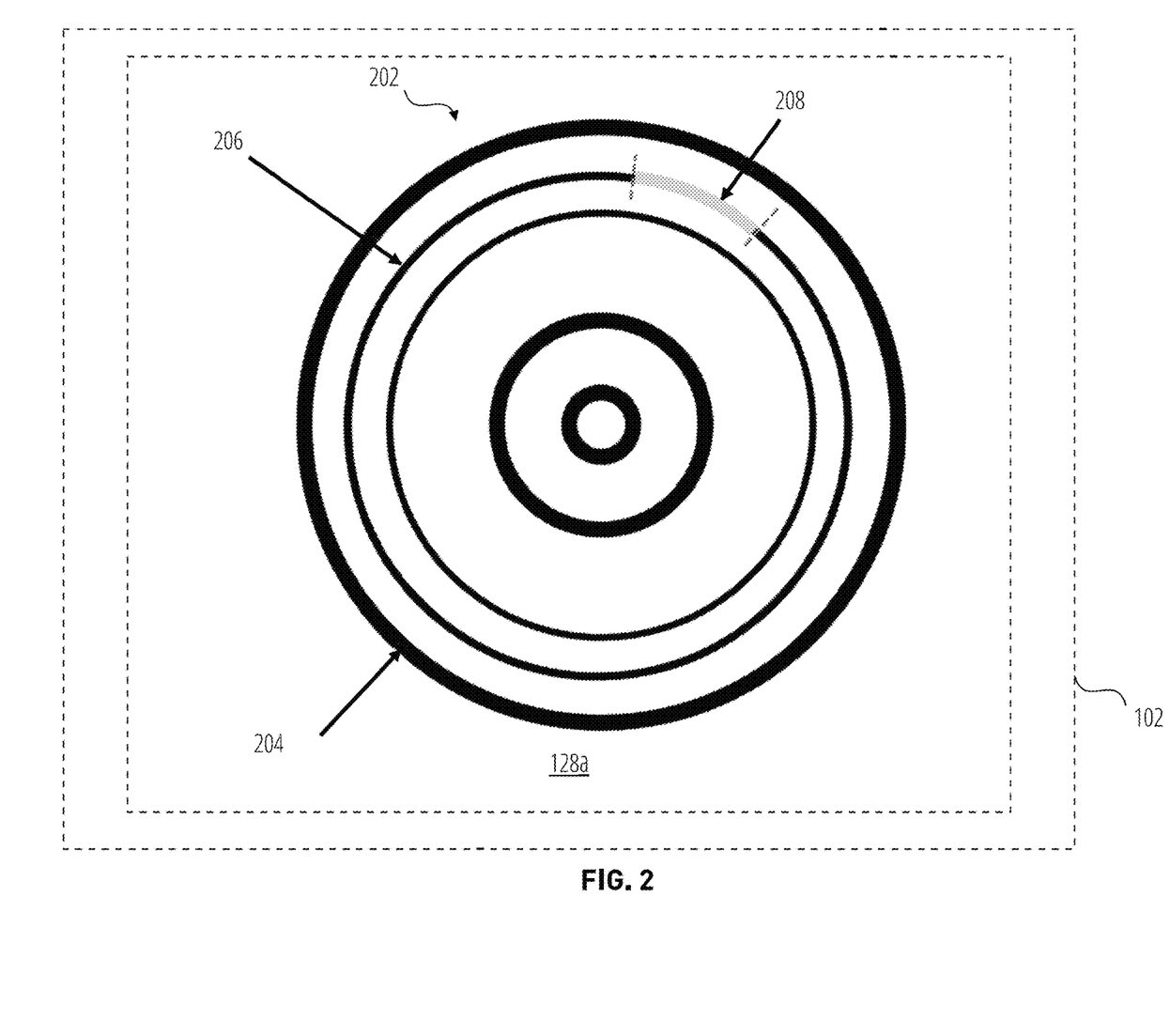
FIG. 2 is a cross-sectional view of a storage device in accordance with embodiments of the present disclosure.

Regarding FIG. 2, the storage array 102 can persistently store data on one of its storage devices 126 (e.g., storage drive 128a). The storage drive 128a can include an HDD 202 with stacks of cylinders 204. Additionally, each cylinder 204, like a vinyl record's grooves, can include one or more tracks 206. Accordingly, the storage array 102 can store data on at least one track portion (e.g., sector 208). Another drive, e.g., storage drive 128c, can include an SSD (not shown). Although both the HDD and SSD are persistent storage devices, each can have different performance characteristics. Specifically, an HDD architecture is known by skilled artisans to be slower than an SSD's architecture. Likewise, the array's memory 114 can include different memory types, each with distinct performance characteristics described herein.

In embodiments, the EDS 110 of FIG. 1 can establish a storage or memory hierarchy based on the SLA and the performance characteristics of the array's storage devices 126 and memory 114. For example, the EDS 110 can establish the hierarchy to include one or more tiers (e.g., subsets of the array's storage and memory) with similar performance capabilities (e.g., response times and uptimes). Thus, the EDS-established fast memory and storage tiers can service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 110 can define "fast" and "slow" performance metrics based on relative performance measurements of the array's storage devices 126 and memory 114. Accordingly, the EDS 110 can define corresponding threshold limits using the relative performance measurements. Thus, the fast tiers can include the storage devices 126 and memory 114 with relative performance capabilities exceeding a first threshold. In contrast, slower tiers can include the storage devices 126 and memory 114, with relative performance capabilities falling below a second threshold. In embodiments, the first and second thresholds can correspond to the same threshold.

In embodiments, the EDS 110 can virtualize the array's physical memory 114 and storage devices 126. Specifically, the EDS 110 can virtualize the array's storage and memory resources by generating logical representations of physical slices or portions of the memory 114 or storage devices 126. For example, the EDS 110 can establish a virtual storage drive using one or more portions of each storage drive 128a-128c. Further, the EDS 110 can assign a logical unit number (LUN) to the virtual storage drive. For example, the EDS 110 can define a logical block address (LBA) that logically represents, e.g., physical address spaces of a drive's sector 208.

In embodiments, the EDS 110 can establish logical tracks (e.g., track identifiers (TIDs) by creating LBA groups, where each LBA can correspond to any of the storage devices 126. For example, the EDS 110 can establish a virtual storage drive (e.g., a logical unit number (LUN)) by creating TID groups. Further, the EDS 110 can generate a searchable data structure, mapping logical storage representations to their corresponding physical address spaces. Further, the HA 108 can present the hosts 134 with the logical memory and storage representations based on host or application performance requirements.

Figure 3A:
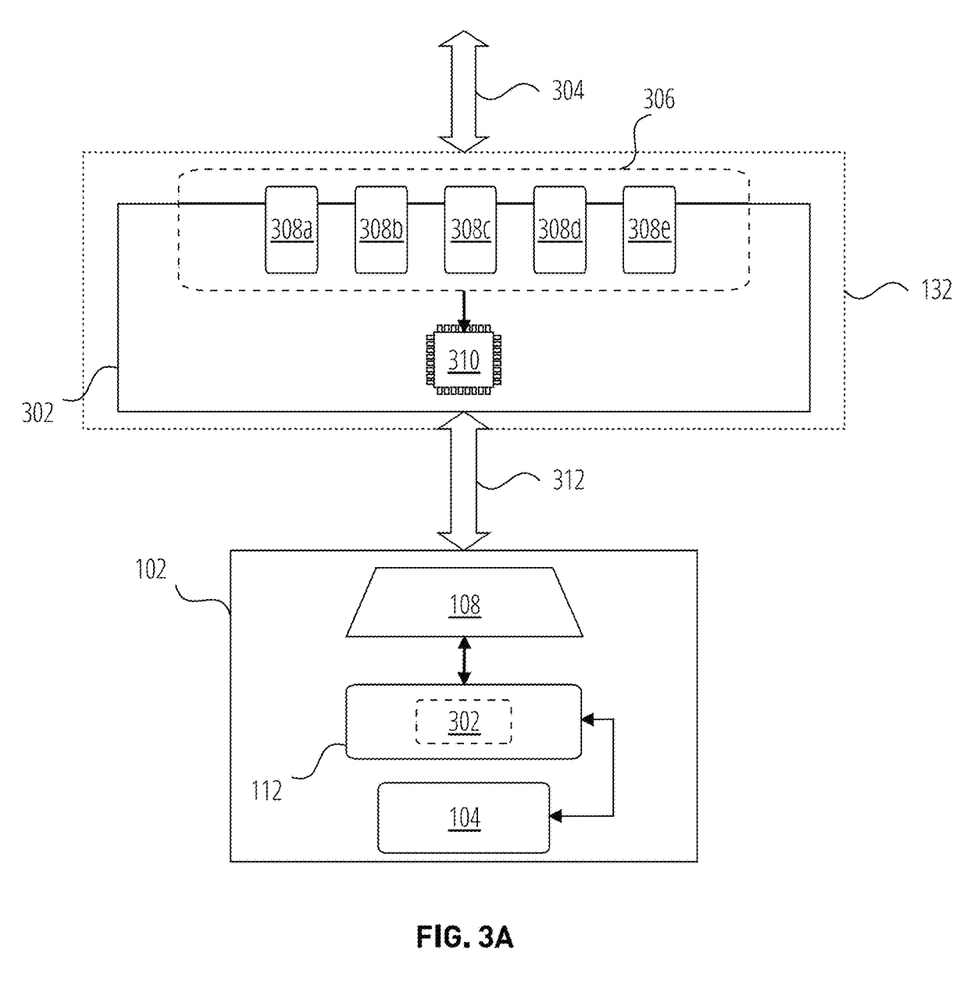
FIG. 3A is a block diagram of an IO gateway in accordance with embodiments of the present disclosure.
Figure 3B:
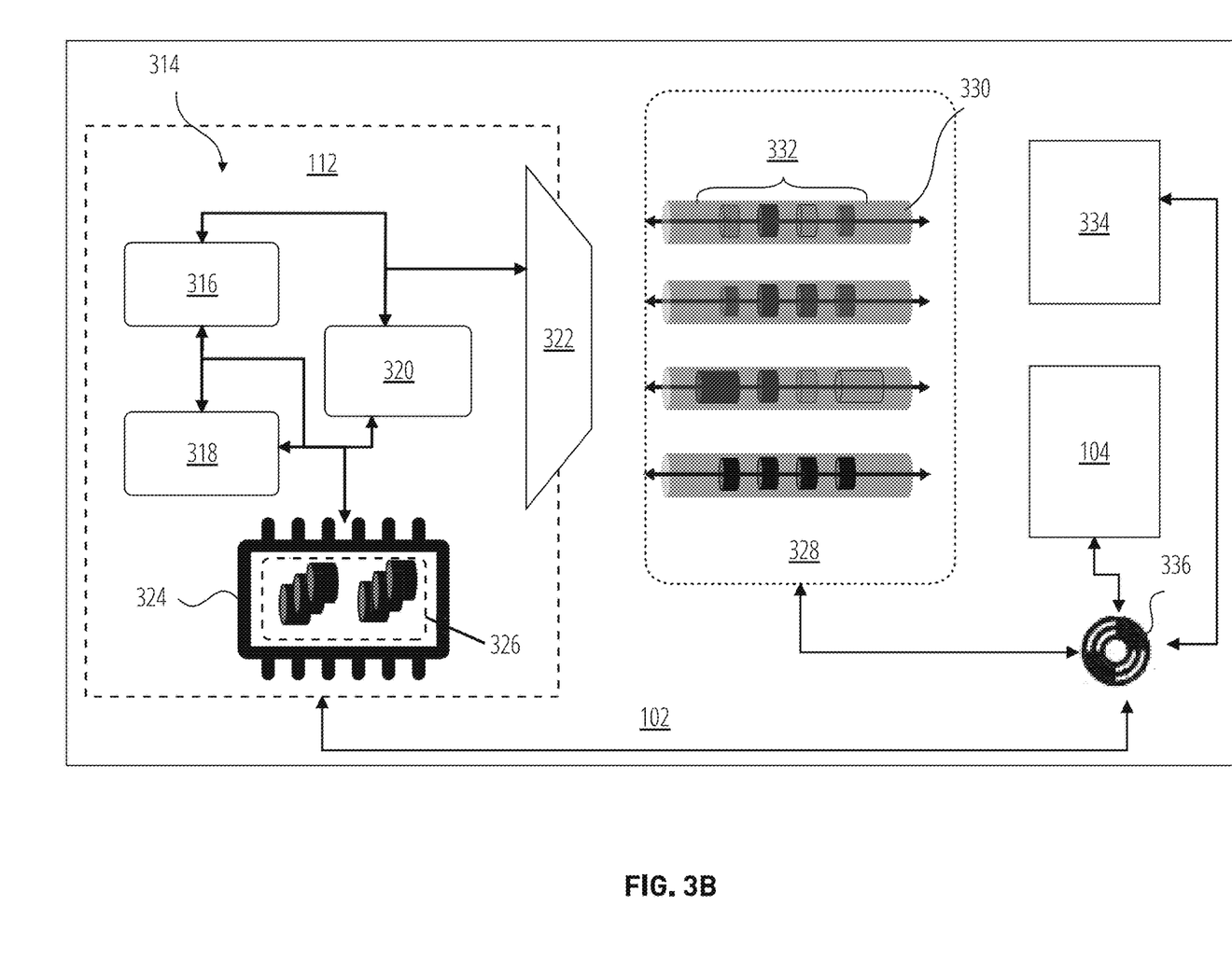
FIG. 3B is a block diagram of a controller in accordance with embodiments of the present disclosure.

Regarding FIG. 3A, a controller 112 can have an architecture (e.g., logic and circuitry) designed to manage one or more microservices (e.g., microservices 332 of FIG. 3B). In embodiments, the controller 112 can include an IO gateway 302 that processes incoming IO requests. In other embodiments, the storage array 102 can be communicatively coupled to the IO gateway 302, e.g., via a network (e.g., the network 132 or RN 138 of FIG. 1).

In embodiments, the IO gateway 302 can include a gateway controller 310 that pre-processes an IO workload 304. The gateway controller 310 can receive instructions from controller 112 to establish one or more API endpoints 306, e.g., APIs 308a-308e. For example, the gateway controller 310 can establish the API endpoints 306 based on one or more IO characteristics. The IO characteristics can correspond to a user profile, host characteristics, application, IO-related SL, IO size, and IO type, amongst other related information. Additionally, the gateway controller 310 can generate access control policies from the instructions that limit endpoint access to authorized requests according to any known or yet to be known techniques.

In embodiments, the gateway controller 310 can assign the APIs 308a-308e unique endpoint addresses (e.g., an HTTP address). Accordingly, the hosts 134 can issue IO requests to the storage array 102 using at least one of the unique endpoint addresses. Further, the gateway controller 310 can analyze each IO request in the IO workload 304. For example, the gateway controller 310 can extract IO characteristic data from each IO request's metadata. Based on at least one or more of a request's related API, endpoint address, or IO characteristic data, the gateway controller 310 can annotate each IO request. For example, the gateway controller 310 can modify a request's existing metadata slot or append a new metadata field with the annotation. The annotation can include resource control information enabling the controller 112 to manage one or more of the storage array's microservices (e.g., microservices 332 of FIG. 3B) as described in greater detail herein.

Regarding FIG. 3B, the storage array 102 can include a controller 112 that manages the array's resources. The resources can include one or more of the array's components 104, microservices, computing threads and computing resources, storage, and memory allocations, and other related resources.

In embodiments, the controller 112 can include one or more software or hardware elements 314 having an architecture designed to control one or more of the array's microservices and corresponding computing, storage, and memory resource allocations. For example, the controller 112 can include a workload analyzer 316 that can monitor and analyze historical, current, or predicted IO workloads and their corresponding IO requests, like the IO workload 304 and its IO requests. Specifically, the workload analyzer 316 can include logic and circuitry designed to analyze the IO workload 304 and its IO requests to identify IO workload and request characteristics. The IO workload and request characteristics can include IO workload/request patterns, temporal information, related SLs, type, size, performance metrics, resource requirements, telemetry information, and thread activity, amongst other related characteristics. In addition, the IO workload characteristics can include IO workload/request-related source application, host, and user type/profile information.

For instance, the workload analyzer's logic and circuitry can define a self-learning neural network that analyzes the IO-related metadata and characteristics and corresponding array-resource and component activity. The workload analyzer 316 can identify IO workload and request patterns and correlated resource and component activity patterns based on the analysis. The IO-related metadata can include IO-parameters) such as IO sizes, IO types, related communication channels, target LBAs, performance requirements (e.g., response times), payload information, timestamps, user/host types, and user/host profiles, amongst other related IO parameters. Additionally, the related resource and component activity can include storage and memory resource allocations, microservice activation, thread activity, component activity, response times, and input/output per second (IOP) rates, amongst other related storage array activity.

The workload analyzer 316 can also monitor the array's resource, thread activity, and component activity using one or more daemons 336. For example, each daemon 336 can communicatively link to the array's components 104 and storage, memory, and computing resources 334 (e.g., memory 114 and storage devices 126 of FIG. 1). Further, each daemon 336 can record its corresponding component's or storage and memory resource's activity in an activity log. Each daemon's activity log can include activity information such as events, computing, and resource consumption levels, device characteristics such as IO data type, data size, storage/memory slot size, performance, SL requirements, and telemetry data, amongst other event-related metadata. Additionally, the workload analyzer 316 can store the activity information (e.g., data 326) in a CLM 324 (controller local memory). The workload analyzer 316 can process the IO-related metadata and characteristic and activity logs to identify IO workload/request patterns with its self-learning neural network architecture.

The workload analyzer 316 can establish reporting schedules that define each daemon's activity collection periods and reporting windows. In addition, the workload analyzer 316 can define the collection periods and reporting windows based on historical, current, and anticipated patterns corresponding to the IO workloads 304, corresponding IO requests, and activity levels. Further, the workload analyzer 316 can generate one or more storage array snapshots corresponding to each collection period. Each snapshot can define the storage array's and the components' respective activity, resource utilization (e.g., storage, memory, and computing resources), and related telemetry data during each collection period. Accordingly, the workload analyzer 316 can generate heatmaps that define activity levels of the storage array 102 and its components 104 using the snapshots.

In embodiments, the workload analyzer 316 can identify activity level ranges of each heatmap. The workload analyzer 316 can dynamically define relative thresholds corresponding to hot or cold activity levels based on the activity level ranges. For example, if a component's activity level is greater than or equal to the first threshold, the workload analyzer 316 can flag the component's activity level as hot. Similarly, a component's activity level can be cold if it is less than or equal to the second threshold. In some embodiments, the first and second thresholds can be equivalent. In other embodiments, the workload analyzer 316 can predefine the thresholds.

Further, the workload analyzer 316 can generate one or more IO workload models based on the IO workload, request patterns, snapshots, and heatmaps. Each IO workload model can define a particular IO workload's characteristics and related temporal predictions. For example, the temporal predictions can include start time, end time, duration, IO sizes, IO types, host-related information (e.g., user profile/role), etc. Further, the workload analyzer 316 can store the IO workload models in the CLM 324.

In embodiments, the controller 112 can further include a microservices manager 320 that can manage and allocate the storage array's resources using the IO workload models and corresponding IO workload/request and activity level patterns. For example, the microservices manager 320 can include logic/circuitry having a machine learning (ML) architecture. Specifically, the ML architecture can define a neural network. The neural network can process the IO workload models and corresponding pattern data (e.g., the IO workload/request patterns and corresponding activity level patterns). Specifically, the microservices manager 320 can correlate IO requests and their corresponding host-related information with the activity patterns. For example, the microservices manager 320 can analyze the correlations over two or more snapshots and further identify correlation patterns.

Thus, the microservices manager 320 can generate an activity mapping that associates each IO request and the request's host-related information to corresponding activity levels. Further, the activity mapping can include the microservices 332 related to the activity levels. Additionally, the microservices manager 320 can record the storage array's storage, memory, and computing resources 334 consumed to perform the activities in the activity mapping. Finally, the microservices manager 320 can further store each activity mapping in the CLM 324.

In embodiments, the controller 112 can further include a gateway manager 318 that can control IO data flows via the IO gateway 302. For example, gateway manager 318 can include logic/circuitry designed to analyze the IO workload models, activity mappings, and related data 326. Specifically, the gateway manager 318 can group an IO workload's related IO requests based on similarities between IO workload/request characteristics, activity levels, consumed storage, memory, and computing resources 334, corresponding microservice activity, and related data 326. In addition, the gateway manager 318 can define the API endpoints 306. for each similarity group. Accordingly, the gateway manager 318 can issue instructions to the IO gateway 302 for establishing the API endpoints 306. Further, the gateway manager 318 can generate resource and microservice models for each API endpoint 306. For example, the models can define the storage, memory, and computing resources 334 and microservices 332 required to process IOs received by API endpoints 306.

In embodiments, the controller 112 can further include a thread controller 322 that establishes one or more processing threads 328 for an IO workload and related IO requests. For example, the thread controller 322 can use the IO workload models, activity mappings, and IO receiving API endpoint information to establish a microservices thread 330 to process IO received at each API endpoint 306. Specifically, the thread controller 322 can provide each thread 330 with the microservices 332 required by the IOs received at each API endpoint 306. Additionally, the thread controller 322 can allocate the storage, memory, and computing resources 334 required by each thread's microservices 332.

Thus, the controller 112 can limit the initialization and execution of the microservices 332 to only those required by each IO workload's related IO requests. By controlling microservice initialization in such a manner, the controller 112 can reduce wasteful consumption of the storage array's storage, memory, and computing resources 334. Consequently, the controller 112 can speed up the storage array's performance (e.g., response times).

The following text includes details of one or more methods or flow diagrams disclosed herein. For context and without limitation, each method is depicted and described as one or more acts. Each act can occur in various orders or concurrently with other acts described herein, or neither presented nor described herein. Furthermore, each act can be optional and, thus, not required to implement each method described herein.

Figure 4:
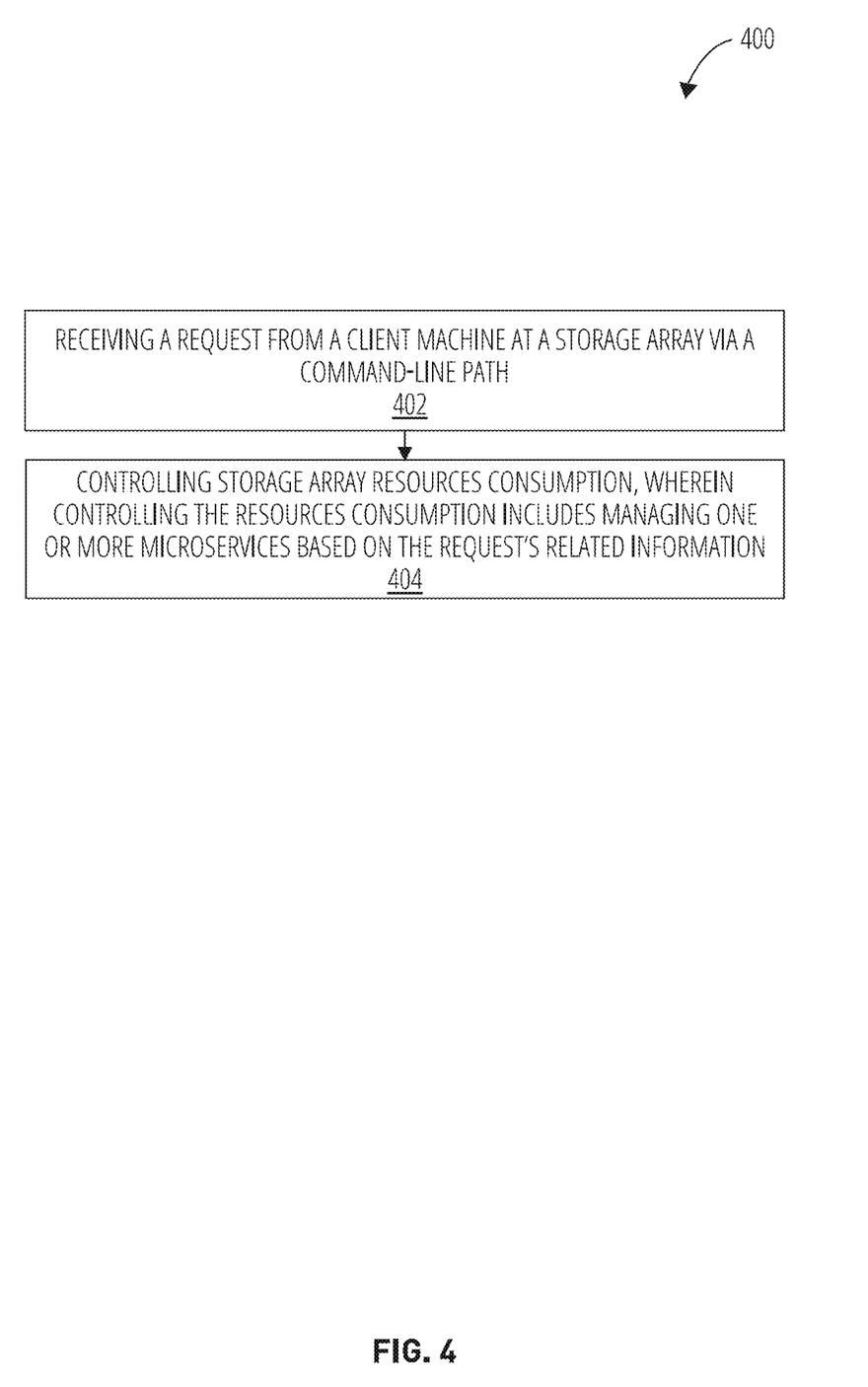
FIG. 4 illustrates a method for controlling one or more microservices in accordance with embodiments of the present disclosure.

Regarding FIG. 4, one or more of the array's components 104 of FIG. 1 can execute method 400 (e.g., controller 112). The method 400 describes actions that manage microservices (e.g., microservices 332 of FIG. 3B). For example, at 402, the method 400 can include receiving a request from a client machine at a storage array via a command-line path. Additionally, at 404, the method 400 can include controlling storage array resources consumption, wherein controlling the resources consumption includes managing one or more microservices based on the request's related information. Furthermore, each step of the method 400 can include any combination of techniques implemented by the embodiments described herein.

A skilled artisan can implement the above-described systems and methods in digital electronic circuitry, computer hardware, firmware, or software using the teachings disclosed herein. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for the execution of a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a backend component can also implement the above-described techniques. The backend component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, wired network(s), or wireless network(s).

The system can include a client(s) and server(s). The client and server (e.g., a remote server) can interact through a communication network. For example, a client and server relationship can arise by computer programs running on the respective computers and having a client-server relationship.

Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
   receiving a request from a client machine at a storage array via a command-line path, wherein the request specifies a user role and an endpoint; and
   dynamically controlling a consumption of storage array resources based on the user role, wherein controlling the consumption includes:
      selectively activating one or more microservices specifically associated with the user role and the endpoint targeted by the request,
      adjusting resource allocation parameters in real-time based on predefined policies associated with the user role and the endpoint, and
      deactivating non-essential microservices not related to the endpoint or the user role to optimize resource usage.

2. The method of claim 1, further comprising:
   selectively initializing microservices that are specifically required for processing the request based on the user role and the targeted endpoint; and
   dynamically deactivating microservices that are not involved in processing the current request to optimize system resource utilization.

3. The method of claim 2, further comprising:
   monitoring each request-related microservice initialized in response to receiving the request; and
   correlating each initialized microservice with one or more characteristics of the request.

4. The method of claim 3, further comprising:
   correlating each initialized microservice with the request's metadata defining the request's characteristics.

5. The method of claim 4, further comprising:
   analyzing historical, current, and anticipated initializations of microservices; and
   generating one or more request-to-microservices initialization models based on the analysis.

6. The method of claim 5, further comprising:
   correlating each request-to-microservices initialization model with one or more input/output (IO) workload models; and
   generating one or more microservices models based on the correlation.

7. The method of claim 6, further comprising:
   controlling the one or more microservices based on the one or more microservices models.

8. The method of claim 1 further comprising:
   pre-initializing one or more array-related microservices based on anticipated requests, wherein these microservices are configured to quickly adapt to incoming requests based on user roles and endpoints.

9. The method of claim 1, further comprising:
   identifying a user profile corresponding to the client machine; and
   determining a user role related to the user profile.

10. The method of claim 1, further comprising:
    determining an application programming interface (API) endpoint to which the client machine issued the request.

11. A computing apparatus comprising:
    a processor; and
    a memory storing instructions that, when executed by the processor, configure the apparatus to:
    receive a request from a client machine at a storage array via a command-line path, wherein the request specifies a user role and an endpoint; and
       dynamically control a consumption of storage array resources based on the user role, wherein controlling the consumption includes:
          selectively activating one or more microservices specifically associated with the user role and the endpoint targeted by the request,
          adjusting resource allocation parameters in real-time based on predefined policies associated with the user role and the endpoint, and
          deactivating non-essential microservices not related to the endpoint or the user role to optimize resource usage.

12. The computing apparatus of claim 11, wherein the instructions further configure the apparatus to:
    selectively initialize microservices that are specifically required for processing the request based on the user role and the targeted endpoint; and
    dynamically deactivate microservices that are not involved in processing the current request to optimize system resource utilization.

13. The computing apparatus of claim 12, wherein the instructions further configure the apparatus to:
    monitor each request-related microservice initialized in response to receiving the request; and
    correlate each initialized microservice with one or more characteristics of the request.

14. The computing apparatus of claim 13, wherein the instructions further configure the apparatus to:
    correlate each initialized microservice with the request's metadata defining the request's characteristics.

15. The computing apparatus of claim 14, wherein the instructions further configure the apparatus to:

analyze historical, current, and anticipated initializations of microservices; and generate one or more request-to-microservices initialization models based on the analysis.

16. The computing apparatus of claim 15, wherein the instructions further configure the apparatus to:

correlate each request-to-microservices initialization model with one or more input/output (IO) workload models; and generate one or more microservices models based on the correlation.

17. The computing apparatus of claim 16, wherein the instructions further configure the apparatus to:

control the one or more microservices based on the one or more microservices models.

18. The computing apparatus of claim 11, wherein the instructions further configure the apparatus to:

pre-initialize one or more array-related microservices based on anticipated requests, wherein these microservices are configured to quickly adapt to incoming requests based on user roles and endpoints.

19. The computing apparatus of claim 11, wherein the instructions further configure the apparatus to:

identify a user profile corresponding to the client machine; and determine a user role related to the user profile.

20. The computing apparatus of claim 11, wherein the instructions further configure the apparatus to:

determine an application programming interface (API) endpoint to which the client machine issued the request.

* * * * *